United States Patent
Ventre

[11] 3,847,733
[45] Nov. 12, 1974

[54] NUCLEAR REACTOR WITH INTEGRATED HEAT EXCHANGER

[76] Inventor: Edmond Ventre, Le Vesinet, France

[22] Filed: July 13, 1971

[21] Appl. No.: 162,216

[30] Foreign Application Priority Data
Aug. 5, 1970 France .............................. 70.28939

[52] U.S. Cl..................... 176/28, 176/62, 176/65, 176/87
[51] Int. Cl..................... G21c 15/00, G21c 19/20
[58] Field of Search ............ 176/18, 28, 30, 31, 32, 176/61, 62, 63, 64, 65, 87

[56] References Cited
UNITED STATES PATENTS
| | | | |
|---|---|---|---|
| 3,580,803 | 5/1971 | Everson et al. ......................... | 176/28 |
| 3,385,760 | 5/1968 | Hawkins ............................... | 176/61 |
| 3,156,624 | 11/1964 | Clifford et al. ......................... | 176/18 |

FOREIGN PATENTS OR APPLICATIONS
| | | | |
|---|---|---|---|
| 1,206,621 | 9/1970 | Great Britain ......................... | 176/30 |

*Primary Examiner*—Benjamin R. Padgett
*Assistant Examiner*—Roger S. Gaither
*Attorney, Agent, or Firm*—Cameron, Kerkam, Sutton, Stowell & Stowell

[57] ABSTRACT

The reactor comprises within a leak-tight vessel a number of reactor cores disposed in a circle on a supporting platform, a fuel-handling device mounted above one of the cores, a heat-exchanger suspended above each of the remaining cores, a central column rigidly fixed to the core-supporting platform and extending through the entire reactor vessel. The central column is coupled at a point located outside the reactor vessel to a system for carrying out the rotary displacement of the column about its own axis and thus causing the rotary displacement of the reactor cores so as to bring each core in turn from the normal operating position beneath a heat-exchanger to the refuelling position beneath the fuel-handling device.

9 Claims, 3 Drawing Figures

NUCLEAR REACTOR WITH INTEGRATED HEAT EXCHANGER

When the core of a nuclear reactor is immersed in a tank or vessel containing the cooling fluid and more especially when the fluid is a liquid metal with an inert cover gas above this latter as is the case in some fast reactor designs, the different parts of the reactor vessel are subjected to extremely different temperatures and the temperature gradient is liable to be hazardous at certain locations such as, for example, between the vessel and the shield roof.

The form of construction in which so-called integrated heat-exchangers are located near the reactor core within the vessel itself would make it possible to ensure uniformity of temperature of the vessel walls, the only remaining hot spot being the space between the reactor core and the heat exchangers. However, one aspect which calls for consideration in reactors of the integrated heat-exchanger type is the refuelling problem. In point of fact, refuelling entails complete shut-down of the reactor followed by cooling of the reactor core before any handling of fuel assemblies can be carried out. The reactor therefore remains out of service over a period which can be of considerable duration.

The aim of this invention is to overcome these disadvantages and to make it possible not only to improve the behavior of the reactor vessel by virtue of an arrangement of heat-exchangers in proximity to the reactor core but also to reduce the time of reactor shut-down for refuelling purposes to a very small value.

This invention relates to a nuclear reactor of the integrated heat-exchanger type which comprises within a leak-tight enclosure a number of reactor cores disposed in a circle on a supporting platform, a fuel-handling device mounted above one of said cores, a heat-exchanger suspended above each of the remaining cores, a central column rigidly fixed to the core-supporting platform and extending through the entire enclosure, said column being coupled at a point located outside said enclosure to a system for carrying out the rotary displacement of said column about its own axis and thus causing the rotary displacment of the reactor cores so as to bring each core in turn from the normal operating position beneath a heat-exchanger to the refuelling position beneath a fuel-handling device.

Since the fuel elements are placed within vertical channels formed in the reactor core, the coolant flows directly from these channels into the heat-exchanger and the only hot spot in the reactor is the space which exists between the reactor core and the heat-exchanger but which can be very small.

Moreover, at the time of refuelling, it is only necessary to shut down the reactor for the period of time which is necessary to carry out the rotary displacement of the reactor cores from one position to the next. Refuelling is then carried out while the cores which are placed beneath the heat exchangers are in operation. Reactor outage is therefore limited to an extremely short time interval and the reactor can be operated with maximum efficiency.

In accordance with another characteristic feature of the invention and by reason of the fact that the reactor cores and the heat-exchangers are placed within a vessel which contains the coolant liquid, pumps for circulating said liquid are mounted within the interior of the central column and valves for controlling the flow of said coolant in the direction of each core are placed at the point of junction between the column and the supporting platform.

The rate of flow of the coolant liquid can thus be regulated differently according as a reactor core is located either in the operating position beneath a heat-exchanger or in the refuelling position.

Furthermore, no sliding or rotary seal is necessary either between the pumps and the cores or between the pumps and the heat-exchangers and this results in a substantial structural simplification of the reactor.

The following description of one embodiment which is given by way of non-limitative example and illustrated in the accompanying drawings will serve to provide a clearer understanding of the different advantages and characteristic features of the invention, reference being made to the accompanying drawings, wherein.

The nuclear reactor which is illustrated is cooled by a liquid contained within the enclosure in which are also placed the reactor core and the primary coolant circuit. A fast reactor comprising a vessel which contains liquid metal coolant and encloses the reactor core is considered by way of example although it is readily apparent that the invention also applies to other types of nuclear reactor.

Figure 2:
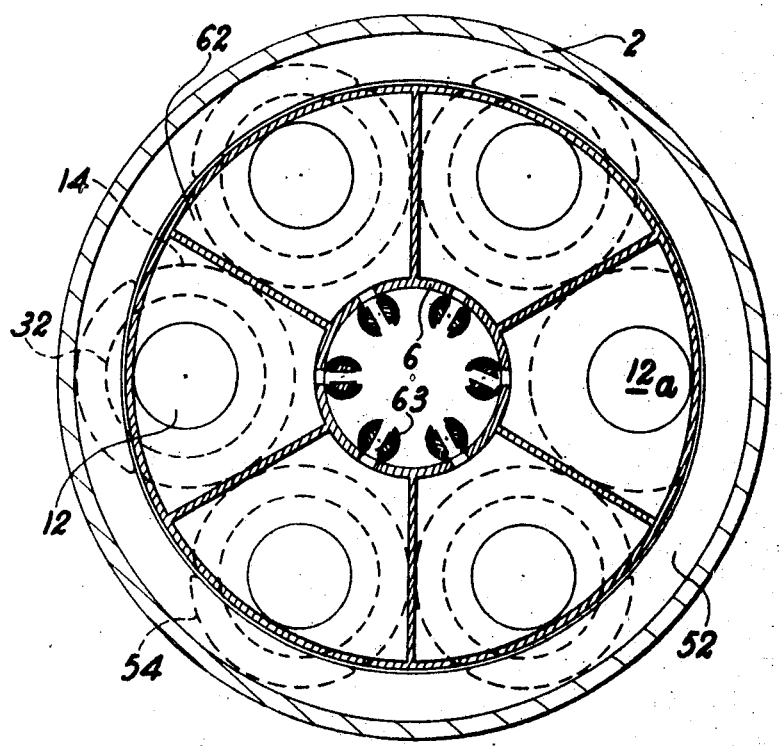
FIG. 2 is a diagrammatic sectional view taken along line I—I of FIG. 1.

This reactor comprises within a biological shield structure 1 a leak-tight vessel 2 containing the coolant liquid and suspended from a top slab 4 which serves to seal-off the enclosure. Said reactor vessel 2 is traversed axially by a column 6 which is centered in the bottom of the vessel by means of a centering boss 8 and is rigidly fixed to an annular supporting platform 10 on which nuclear reactor cores 12 are disposed at uniform intervals. In the exemplified embodiment which is illustrated in FIG. 2, provision is made for six reactor cores but it is wholly apparent that this number is given only by way of example. Vertical channels 13 containing the fuel assemblies are formed within said cores and the coolant liquid supplied from the vessel 2 is circulated upwardly within said channels. Each reactor core is protected laterally by a neutron shield 14 which is supported by the platform 10 over the greater part of its periphery.

Figure 1:
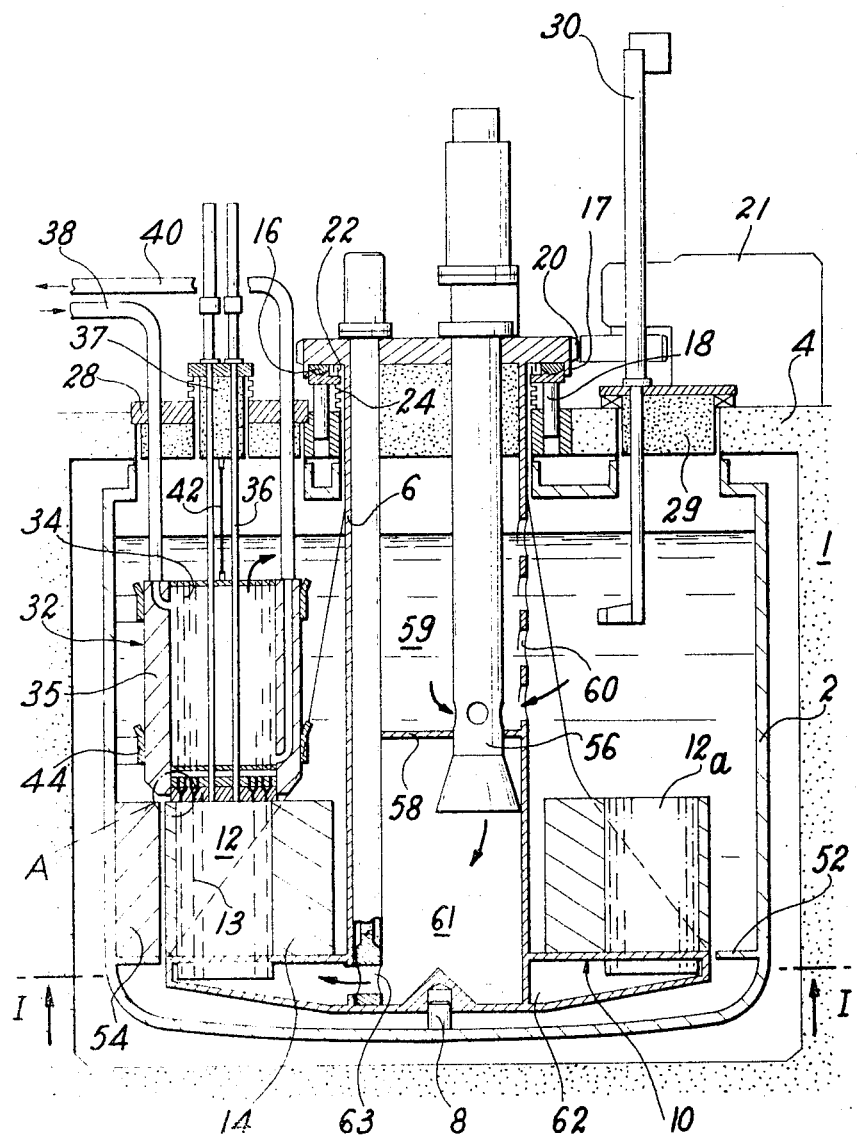
FIG. 1 is a longitudinal sectional view of a nuclear reactor of the integrated heat-exchanger type which is cooled by a liquid.

At the end remote from the boss 8 as shown in FIG. 1, the column 6 passes through the top slab 4 and is supported externally of the enclosure by shoes 16 which form an annular sliding surface and rest on a ring 17 which is in turn supported by means of vertical jacks 18. The column is also rigidly fixed to a peripheral toothed annulus 20 which serves to drive said column in rotation about its own axis by means of the drive system 21. This rotary motion can be total and cause complete displacement of the annulus but is preferably limited to a pivotal movement alternately in one direction and in the other, that is to say through an angle of 180°. A leak-tight passage through the column 6 is provided on the one hand by liquid seals 22 which are mounted coaxially with the shoes 16 and with the ring 17 and on the other hand by a bellows seal 24 for providing a connection between the slab 4 which supports the jacks 18 and said ring 17.

The top slab 4 is also provided around the column 6 with a series of openings which are equal in number to the reactor cores 12, each opening being closed by a plug 28, 29.

One of said plugs 29 supports a device 30 for handling the fuel elements of one of the reactor cores 12a which is placed immediately beneath whilst the other plugs 28 support heat exchangers 32, each heat exchanger being suspended above one of the other reactor cores 12. At the level of each normal-operation station, namely at the level of each heat-exchanger, the reactor vessel 2 carries on an annular bracket 52 a neutron shield 54 which is complementary to the peripheral neutron shield 14.

Within each heat-exchanger 32, a vertical tube bank 34 through which the primary coolant passes is placed around control-rod guide tubes 36 which connect the reactor core 12 through a detachable plug 37 for closing an orifice of the plug 28 to an external control device which is not shown in the drawing. Pipes 38 for the admission of the secondary coolant extend through the plug 28 and open into the top portion of the heat-exchanger whilst pipes 40 for the discharge of said secondary coolant open into the bottom portion of said heat-exchanger, are located parallel to the tubes 34 of the heat-exchanger wall and also pass through the plug 28. (Only one pipe 38 and 40 has been shown in order to simplify the drawing). The secondary coolant thus flows through the heat-exchanger 32 in the downward direction whilst the primary coolant flows upwards, that is to say from the reactor core towards the top portion of the vessel 2. Since the heat-exchangers are suspended from the plug 28 by means of tie-rods 42, for example, said heat-exchangers are centered at the bottom and top portions thereof by means of annular support strakes 44 which are secured to the side wall of the reactor vessel 2. The alignment of the control-rod guide tubes within the reactor core and within the heat-exchanger as well as the alignment of the devices which control the movement of said rods is ensured.

Figure 3:
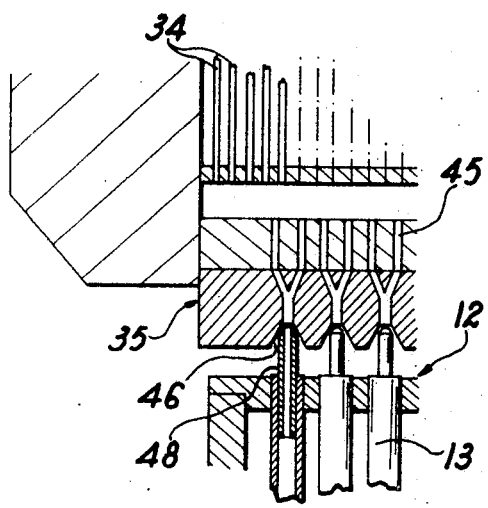
FIG. 3 is a detail view of point A of FIG. 1.

Said heat-exchangers are surrounded externally by a neutron shield 35 and the bottom portion of each shield is traversed by ducts 45 which provide a communication between the primary coolant tubes 34 and the core channels 13, as shown in FIG. 3. Said ducts 45 open into flared V-shaped recesses 46 for accommodating the heads of fuel elements 48 which are contained in the reactor fuel channels 13. The coolant liquid derived from the reactor core is thus guided towards the flared recesses 46 and the ducts 45. Leak-tightness between the reactor core 12 and the heat-exchanger 32 is obtained without resorting to the use of any special devices or fastening systems.

However, it is preferable and more reliable in some cases to ensure leak-tightness simply by engaging around the reactor core itself an external cylindrical skirt which is rigidly fixed to the heat-exchanger. The need to make provision for flared recesses 46 and for projecting fuel element heads 48 is accordingly dispensed with. Alignment of the control-rod guide tubes both of the reactor core and of the heat-exchanger is nevertheless ensured.

The heat-exchanger and reactor core can therefore be moved either towards or away from each other simply as a result of vertical displacement of one of these units. Vertical displacement of the core with respect to the heat-exchanger is obtained by means of jacks 18 which control the position of the column 6 and consequently of the pivotal supporting platform 10 with respect to the top slab 4. When the downward movement of said jacks 18 has disengaged the reactor cores 12 from the heat-exchangers 32, a pivotal movement of the column 6 produced by the toothed annulus 20 permits displacement of said cores about the axis of the column 6. The reactor cores can therefore be transferred from position 12 beneath a heat-exchanger 32 which corresponds to their normal operation to the refuelling position 12a beneath the fuel-handling device 30. When one of the reactor cores is located in this position, the other cores are in the operating position and the reactor can be maintained in service at the same time as the refuelling is being performed whilst the core 12a may be held in reserve if necessary.

In addition, pumps 56 for controlling the circulation of coolant are placed within the interior of the column 6. Said pumps are supported by a partition-wall 78 which divides the column 6 into two sections. The inlets of said pumps thus open into an upper compartment 59 having a perforated side wall 60 which is in communication with the coolant liquid containment vessel and consequently with the outlet of the heat-exchangers 32. The outlets of said pumps open into a lower compartment 61 which is isolated from the coolant vessel but is in communication with the interior of the supporting platform, that is to say with the internal chambers 62 of said platform within which the fuel-channel inlets of each reactor core are located. However, a valve 63 controls the communication between the compartment 61 and each chamber 62 of the supporting platform 10. Said valves which are preferably of the sash-gate type serve to regulate the flow of coolant which penetrates into each core and especially to modify the flow rate according as the core is located either beneath a heat-exchanger in the operating position or is stopped and placed in the refuelling position.

Leak-tightness between the section of the enclosure which contains the coolant at high pressure as delivered from the pumps and the section containing the coolant at low pressure which is delivered from the reactor core is ensured by means of the partition-wall 58 of the column 6. Since the coolant temperatures within the two sections are close in value, there is no potential danger of relative thermal expansions of the partition-wall and the pumps. Provision is not made for any rotary or sliding seal or for any particular sealing system between the outlets of the heat-exchangers and the inlets of the pumps or between the outlets of these latter and the inlets of the different reactor cores. The only points at which particular leak-tightness is necessary are the junctions between the reactor cores and the heat-exchangers and this leak-tightness is ensured to a sufficient extent as a result of penetration of the fuel elements into the recesses of the neutron shield. It is in any case not necessary to ensure a very high standard of leak-tightness since the pressure drop within the heat-exchanger is of a low order.

A reactor having a very high degree of safety and reliability is thus obtained while maintaining substantially similar values of temperature throughout the leak-tight enclosure and minimizing the shut-down time which is necessary for refuelling.

In fact, only one stoppage is necessary and this is to permit cooling of the reactor cores prior to rotation and then to permit the rotation itself.

It is readily apparent that a number of different modifications could be made in the embodiment which has just been described without thereby departing either from the scope or the spirit of the invention.

What we claim is:

1. A nuclear reactor of the integrated heat-exchanger type comprising a leak-tight enclosure, a number of reactor cores disposed in a circle in said enclosure, a supporting platform for said cores, a fuel-handling device mounted above one of said cores in said enclosure, a heat-exchanger in said enclosure suspended above each of the others of said cores, a central column rigidly fixed to said enclosure, a system outside said enclosure for rotating said column about its axis and for rotating said reactor cores from a position beneath a heat-exchanger to a position beneath said fuel-handling device, vertical jacks supporting said column on said enclosure and for raising and lowering said platform and said reactor cores with respect to said heat-exchangers, fuel elements in said cores, heads for said fuel-elements, a neutron shield fixed beneath each of said heat-exchangers and opening through said shield receiving said heads when said platform is raised.

2. A reactor according to claim 1, each of said heat-exchangers being rigidly fixed to an external cylindrical skirt which engages over the adjacent one of said reactor cores.

3. A reactor according to claim 1, each of said heat-exchangers having vertical tubes, a primary coolant in said enclosure circulated through said tubes, a secondary coolant circuit, control-rod guide tubes within said circuit opening into the adjacent reactor core and inlets for said secondary coolant circuit at the top of said heat exchanger.

4. A reactor according to claim 3, each of said secondary coolant circuits including peripheral tubes and ducts for the secondary coolant parallel to said tubes for the circulation of the primary coolant.

5. A reactor according to claim 3, including pumps for circulating said primary coolant liquid within said central column and valves for controlling the rate of flow of said primary coolant liquid toward each of said reactor cores located adjacent said column and said supporting platform.

6. A reactor according to claim 5, including a partition-wall supporting said pumps and dividing said central column into two sections, one of said sections including said valves and the outlets of said pumps and the other of said sections communicating with the outlet of said heat exchangers and the inlets of said pumps.

7. A reactor according to claim 6, including openings in said column above said partition-wall.

8. A reactor according to claim 1 including a biological shield element at the level of each of said heat-exchangers mounted on and within said enclosure.

9. A reactor according to claim 1, including removable plugs for said enclosure, said heat-exchangers, said control rods and said fuel-handling device being supported by said plugs.

* * * * *

UNITED STATES PATENT OFFICE
CERTIFICATE OF CORRECTION

Patent No. 3,847,733          Dated November 12, 1974

Inventor(s) Edmond Ventre

It is certified that error appears in the above-identified patent and that said Letters Patent are hereby corrected as shown below:

ASSIGNEE

[73] Electricite De France (Service National)
75 Paris, France

Signed and sealed this 4th day of February 1975.

(SEAL)
Attest:

McCOY M. GIBSON JR.           C. MARSHALL DANN
Attesting Officer             Commissioner of Patents